Patented Sept. 13, 1932

1,877,302

UNITED STATES PATENT OFFICE

ERNEST F. GRETHER, OF MIDLAND, MICHIGAN, ASSIGNOR TO THE DOW CHEMICAL COMPANY, OF MIDLAND, MICHIGAN, A CORPORATION OF MICHIGAN

AZO DYESTUFFS AND METHOD OF MAKING SAME

No Drawing.   Application filed March 19, 1929.   Serial No. 348,362.

The present invention relates to certain new compounds derived from phenyl-α-naphthyl ether, viz. nitro-, amino- and azo derivates thereof, the last named being useful dyestuffs for which the first two are intermediate products, together with methods for the preparation of such compounds.

In my pending application Serial No. 289,081, filed June 28, 1928, I have described and claimed certain sulphonic and nitro-sulphonic acid derivatives of the above mentioned phenyl-α-naphthyl ether, and also, incidentally, have referred to a mono-nitro derivative of said ether. It is among the objects of the present application to describe more particularly the steps for the preparation of said mono-nitro derivative. Another object is to describe the preparation of the corresponding amino- derivative and of azo derivatives to be prepared therefrom by diazotizing such amine and coupling with suitable aryl residues. A further object is to describe more particularly the preparation of such azo derivatives which are formed by coupling with arylides of 2.3-hydroxy-naphthoic acid. Generally speaking, the azo derivatives which are included in the subject matter of the present application are useful dyestuffs, and especially those derivatives containing as one component an arylide of the aforesaid 2,3-hydroxy-naphthoic acid. To the accomplishment of the foregoing and related ends, the invention, then, consists of the new products, together with the steps involved in making such products, hereinafter fully described and particularly pointed out in the claims, the following description setting forth but several of the various ways in which the principle of the invention may be used.

Preliminary to the preparation of the azo dyestuffs herein described I make the requisite intermediate compounds by first nitrating phenyl-α-naphthyl ether and then reducing the mono-nitro compound so obtained to form the mono-amino compound. The nitration of the aforesaid ether according to the usual procedure does not yield satisfactory results, owing largely to the relative insolubility of the ether and its nitro derivative in an aqueous medium. I have found that far better results are realized when the nitration is carried out in a medium of glacial acetic acid. Accordingly I proceed as follows;

I dissolve 1 mole phenyl-α-naphthyl ether in 6 parts by weight glacial acetic acid and then add gradually with stirring 1 mole concentrated nitric acid diluted with 2 parts by weight glacial acetic acid, maintaining the temperature below 25° C. After all of the nitric acid has been added, stirring is continued for about 1/2 hour longer, then ice water to the amount of about 1/10 to 1/5 of the volume of the reaction mixture is added. The mono-nitro compound separates as a precipitate of yellow crystal flakes, which are filtered from the mother liquor and washed with water. If the liquor is made more dilute, the crystal product is obtained in a less pure form. The product recrystallized from alcohol or acetic acid has M. P. 93°–94° C.

Probable formula;—

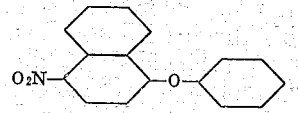

The reduction of the nitro compound for the preparation of the amino compound is performed in the usual way, viz;—

A mixture consisting of 200 parts by weight iron filings, 400 parts water and 6 parts by weight concentrated hydrochloric acid is heated with stirring while 100 parts by weight of the nitro compound are gradually added. When the mixture has become colorless, it is neutralized with sodium carbonate, filtered and the amino compound is extracted with benzene or other suitable solvent. The benzene extract is dried, the benzene distilled off and finally the amine distilled in vacuum. It forms colorless crystals, M. P. 54° C. The hydrochloric acid salt is only very slightly soluble in water.

From the amino compound the diazo derivative is prepared and the latter may then be coupled with a suitable aromatic amine or phenol. I have found that when coupled with arylides of 2.3-hydroxy-naphthoic acid dyestuffs are produced which are substantially completely insoluble in water and exhibit very good fastness to light and washing. The colors produced are in exceptionally clear, deep shades of red to violet. These dyes are best applied by developing directly on the fibre, as in the following illustrative example;

Cotton material is treated with an alkaline solution of 2.3-hydroxy-naphthoic acid anilide (Naphthol A S) until the fibres are thoroughly impregnated therewith. A diazo solution is prepared by suspending 23.5 parts by weight 1-amino-4-phenoxy-naphthalene in dilute hydrochloric acid, adding a solution containing 7 parts by weight sodium nitrite and then adding alkali carbonate or acetate until the solution is almost neutralized. The previously treated material is then immersed in the diazo solution in the cold. The dye is developed directly on the fibre, a clear deep shade of violet red, possessing very good fastness to light and washing. The compound has probably the following structural formula;

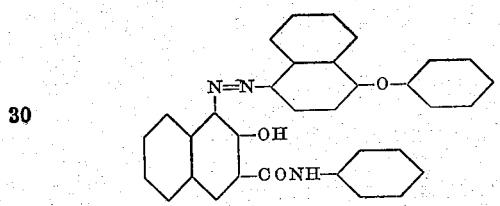

While a fast dyeing is readily achieved without the aid of mordants, the use of various substances for the purpose of fixing the dye, or promoting its absorption by the fibre, or modifying the color tone thereof, in connection with the procedure above described is equally comprehended within the invention. For example, after-treatment with chromium or copper salts introduces a definite color modification in softer and less brilliant tones.

In similar fashion I have prepared other dyes of this same type, as shown in the appended table, wherein the first column lists the particular arylides of 2.3-hydroxy-naphthoic acid that were coupled with the diazo derivative of 1-amino-4-phenoxy-naphthalene and the second column shows the color shade produced on the dyed material.

| 1-amino-4-phenoxy-naphthalene diazotized and coupled with arylide of 2.3-hydroxy acid from:— | Color |
|---|---|
| α-naphthylamine | Deep violet red |
| Diamino-diphenyl ether | Deep red |
| Ortho-nitro-para-phenetidine | Brownsih red |
| 3,4 dichloraniline | Purple violet |
| Meta-nitraniline | Purple violet |
| Para-phenetidine | Violet red |
| Ortho-chlor-para-nitraniline | Reddish brown |

The typical formula for the dyes of the present description may be expressed as follows, wherein R represents an aryl residue which may be further substituted, as for example, by halogen, nitro, amino, hydroxy or alkoxy groups;

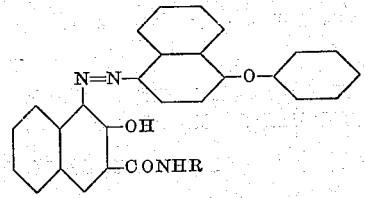

It is likewise included within the invention to introduce further substituent groups into the phenyl and/or naphthyl nuclei of the 1-amino-4-phenoxy-napthalene component of the present group of new dyestuffs.

Although in the specific example given above I have described the treatment of the cotton fibre, I may apply these dyes to other textile fibres of vegetable or animal origin, such as silk, or to synthetically prepared fibres, such as rayon or the like.

It is further within the purview of my invention to prepare dyes of the present type in substance, as well as to develop same in situ on the fibre. That is to say, the solutions of the respective reaction components may be brought together directly, the dye then being precipitated from the aqueous reaction mixture and separated therefrom by any convenient means. Owing to their insolubility, stability and fastness to light and water, these dye compounds may also be used as pigments.

Other modes of applying the principle of my invention may be employed instead of the one explained, change being made as regards the materials employed, provided the ingredients stated by any of the following claims or the equivalent of such stated ingredients be employed.

I therefore particularly point out and distinctly claim as my invention:—

1. The method of making new azo dyestuffs which comprises diazotizing 1-amino-4-phenoxy-naphthalene and coupling with an arylide of 2.3-hydroxy-naphthoic acid.

2. The method of making new azo dyestuffs which comprises diazotizing 1-amino-4-phenoxy-naphthalene and coupling with 2.3-hydroxy-naphthoic acid anilide.

3. As a new product, an azo dyestuff having probably the formula;

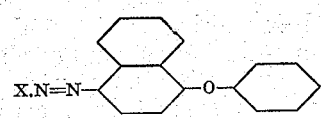

wherein X represents an arylide of 2.3-hydroxy-naphthoic acid.

4. As a new product, an azo dyestuff having probably the formula;

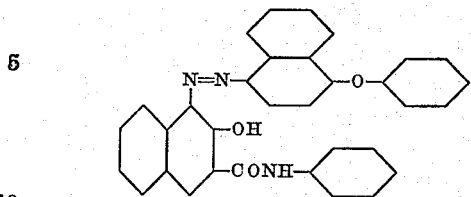

5. The method of making new azo dyestuffs which comprises diazotizing amino-alpha-phenoxy-naphthalene having the general formula

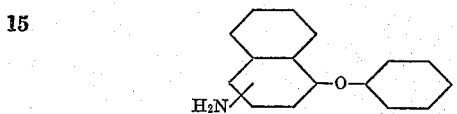

and coupling with an arylide of 2.3-hydroxy-naphthoic acid.

6. As a new product, an azo dyestuff having the general formula

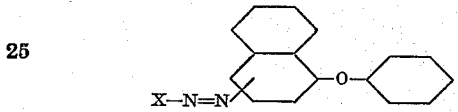

wherein X represents an arylide of 2.3-hydroxy-naphthoic acid.

Signed by me this 15 day of March, 1929.

ERNEST F. GRETHER.